(12) United States Patent
Li (10) Patent No.: US 7,076,834 B2
(45) Date of Patent: Jul. 18, 2006

(54) CABINET DOOR BUFFER BAR

(75) Inventor: Chih-Hung Li, Taipei (TW)

(73) Assignee: Lushridge Incorporated, Taipei (TW)

( * ) Notice: Subject to any disclaimer, the term of this patent is extended or adjusted under 35 U.S.C. 154(b) by 22 days.

(21) Appl. No.: 10/819,132

(22) Filed: Apr. 7, 2004

(65) Prior Publication Data

US 2004/0231099 A1 Nov. 25, 2004

(30) Foreign Application Priority Data

May 20, 2003 (TW) ................................ 92113592 A (51) Int. Cl.
*E05F 5/06* (2006.01)
(52) U.S. Cl. .......................................... 16/85; 16/86 A
(58) Field of Classification Search .................... 16/85, 16/86 R, 82, 86 A, 86 B, 66, 69, 70, 71; 292/DIG. 15, DIG. 19, 23; 312/238; 248/188.4, 248/410, 411; 188/283, 282.1, 282.4, 282.9, 188/281, 282.5
See application file for complete search history.

(56) References Cited

U.S. PATENT DOCUMENTS

| | | | | |
|---|---|---|---|---|
| 1,816,024 A | * | 7/1931 | Petersen ........................ | 16/85 |
| 2,449,686 A | * | 9/1948 | Brinda ........................... | 16/85 |
| 2,953,810 A | * | 9/1960 | Hall ............................... | 16/52 |
| 3,207,498 A | * | 9/1965 | Wustenhagen et al. .. | 267/64.11 |
| 3,317,215 A | * | 5/1967 | Wolniak et al. ............... | 277/558 |
| 3,376,088 A | * | 4/1968 | Bol et al. ..................... | 292/353 |
| 3,593,367 A | * | 7/1971 | Waldo ........................... | 16/66 |
| 4,079,925 A | * | 3/1978 | Salin ............................ | 267/129 |
| 4,110,868 A | * | 9/1978 | Imazaike ....................... | 16/84 |
| 4,483,044 A | * | 11/1984 | Johnston et al. ............... | 16/70 |
| 4,718,647 A | * | 1/1988 | Ludwig .................... | 267/64.11 |
| 4,817,238 A | * | 4/1989 | Liu ................................ | 16/66 |
| 4,856,625 A | * | 8/1989 | Oshida ..................... | 188/282.1 |
| 4,948,103 A | * | 8/1990 | Bowden et al. ............... | 267/34 |
| 5,579,874 A | * | 12/1996 | Jeffries et al. ........... | 188/282.9 |
| 6,553,617 B1 | * | 4/2003 | Salice ........................... | 16/85 |

FOREIGN PATENT DOCUMENTS

| | | | |
|---|---|---|---|
| DE | 3922932 A1 | * | 1/1991 |
| EP | 1162338 A2 | * | 12/2001 |
| EP | 1319787 A1 | * | 6/2003 |
| EP | 1348828 A2 | * | 10/2003 |
| WO | WO 2004095982 A1 | * | 11/2004 |

* cited by examiner

*Primary Examiner*—Chuck Mah
(74) *Attorney, Agent, or Firm*—Birch, Stewart, Kolasch & Birch, LLP (57) ABSTRACT

A cabinet door buffer bar includes a hollow tube, a shaft, an elastic element and a sliding member. The sliding member and the inner wall of the hollow tube form different intervals there between so that a resilient member mounted thereon receives varying constraints and generates different buffer forces in different moving directions thereby provides the cabinet door a required buffer force to avoid generating annoying noise and incurring damages during closing of the cabinet door.

14 Claims, 7 Drawing Sheets

CABINET DOOR BUFFER BAR

This nonprovisional application claims priority under 35 U.S.C. § 119(a) on Patent Application No. 92113592 filed in Taiwan on May 20, 2003, which is herein incorporated by reference.

FIELD OF THE INVENTION

The present invention relates to a cabinet door buffer bar for controlling moving speed of a moving mechanism and serving as a damping buffer and particularly to a buffer bar to prevent a cabinet door from generating annoying noise and being damaged while closing.

BACKGROUND OF THE INVENTION

A buffer bar generally is used to control the speed of door opening/closing and a moving mechanism. The most common application is a door check for automatically and slowly closing the door without generating a big noise or damaging the door or door frame. It also may be adopted on other movable mechanisms that have a returning force and also need a resistant force against the movement to serve as a damping buffer. In general, the buffer resistant force generated by the buffer bar has two types of sources: a pneumatic type and an oil pressure type, or the so-called air pressure bar and oil pressure bar.

The conventional buffer bar has a big drawback, i.e. oil leakage or air leakage. This problem could cause dysfunction of the buffer bar. When used on cabinet windows or doors, in addition to the aforesaid problem, the factors of outside appealing and ornamental effect also have to be considered. The huge noise of the pneumatic bar and oil leakage of the oil pressure bar are problems not acceptable for general cabinets. While the huge noise of the pneumatic bar makes the cabinet not appealing, oil leakage of the oil pressure bar tends to smear the cabinet and articles held in the cabinet.

Hence the cabinet generally is not equipped with the buffer bar. As a result, a big noise is generated when the cabinet door is closed, and the cabinet door or cabinet is easily damaged. Because of the appealing consideration, someone introduced a buffer bar in a conventional hinge. However, while the hinge thus made has a buffer function, it is still not effective. And the problems mentioned above still exist.

SUMMARY OF THE INVENTION

Therefore the present invention aims to resolve the aforesaid problems and provide a cabinet door buffer bar that has a required buffer force to prevent the cabinet door from generating annoying noise and being damaged while closing.

The cabinet door buffer bar according to the invention includes a hollow tube, a shaft and an elastic element. The hollow tube is to house the shaft and enables the shaft to be movable therein. The elastic element provides a returning force for the relative movement. The buffer resistant force is generated by the interference between a resilient member located outside the shaft and the inner wall surface of the hollow tube.

In one aspect, the front end of the shaft and the inner wall of the hollow tube have a gap, which varies in the axial direction of the shaft. Hence the resilient member on the front end of the shaft can generate a different degree of friction when it slides in different directions, thereby it creates a buffer effect desired.

In another aspect, a coupling ring made from a buffer material is provided that has one end fastened to the shaft and another end coupled with a sliding member. The sliding member is made of a hard material so that when the shaft is moved relative to the hollow tube, the sliding member is slid through the coupling ring, and the coupling ring is extended without generating friction with the inner wall surface of the hollow tube. When the shaft is moved inwards, the coupling ring compresses the sliding member and results in deformation and radial expansion of the coupling ring. As a result, interference occurs between the coupling ring and the inner wall surface of the hollow tube, to provide a buffer resistant force.

Another object of the invention is to provide a buffer bar that has an adjustable buffer resistant force.

The damping unit includes an adjustment element for adjusting the moving interval of the sliding member. Thus the movable range of the sliding member is altered when the buffer bar returns to enable the coupling ring to generate a different degree of expansion, thereby changing the buffer resistant force of the buffer bar.

The foregoing, as well as additional objects, features and advantages of the invention will be more readily apparent from the following detailed description, which proceeds with reference to the accompanying drawings.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1A:
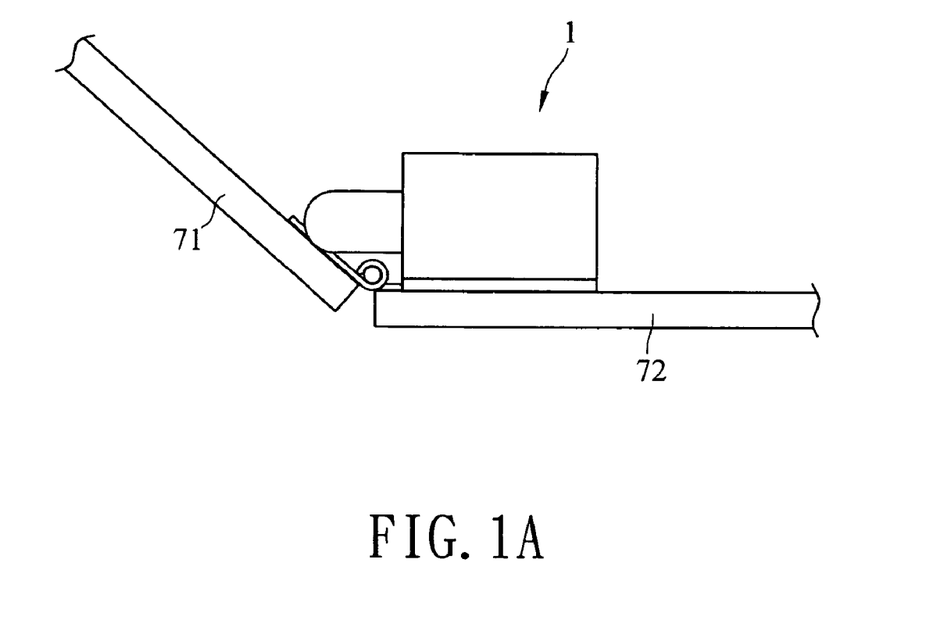
FIGS. 1A and 1B are schematic views of the invention in use conditions.

The cabinet door buffer bar 1 according to the invention aims to be installed on a cabinet wall 72 of a cabinet door 71 (referring to FIGS. 1A and 1B) to provide a buffer when the cabinet door 71 is closed (referring to FIG. 1A). When the cabinet door is closed in normal conditions, it provides an elastic force smaller than the closing force of the cabinet door 71 (referring to FIG. 1B), to maintain the cabinet door in the closed condition.

Figure 2:
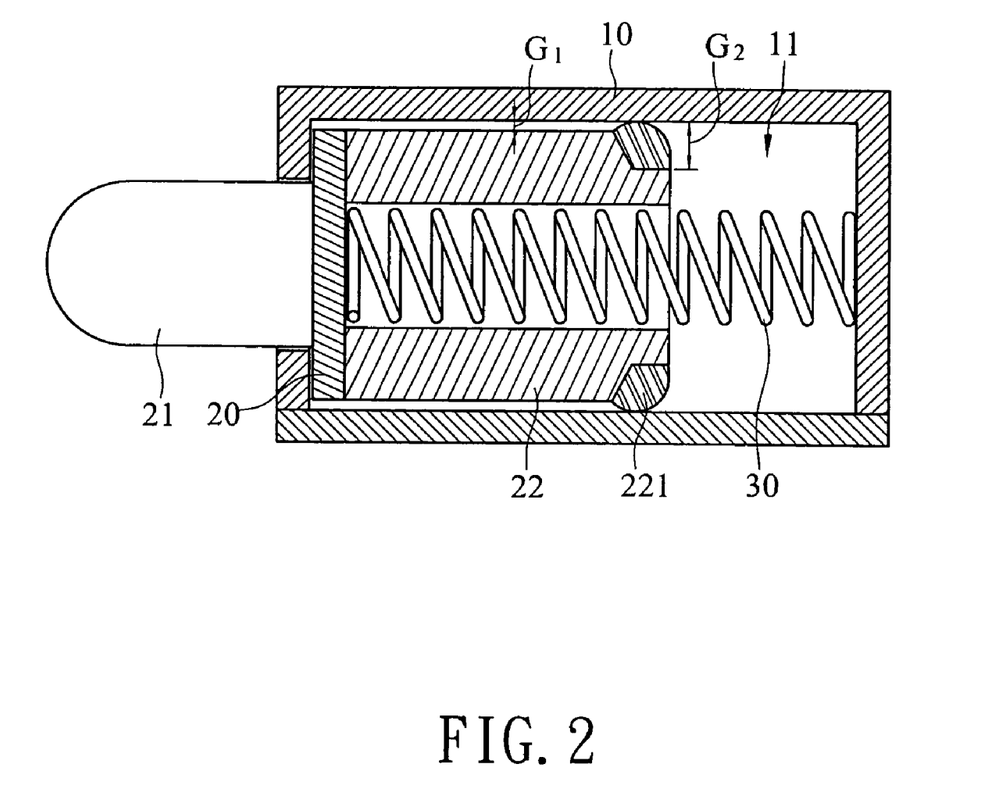
FIG. 2 is a schematic view of a first embodiment of the invention.

Refer to FIG. 2 for a first embodiment of the invention. It includes a hollow tube 10, a shaft 20, an elastic element 30 (mostly a spring, the drawing shows merely an example) and a resilient member 221. The hollow tube 10 has a housing compartment 11 to house the shaft 20. The shaft 20 has a tongue 21 located at the bottom end and is extended outside. The elastic element 30 is housed in the housing compartment 11, pressing the bottom of the shaft 20 to provide a returning elastic force. The hollow tube 10 has a bottom end to allow the tongue 21 to be extended and exposed without the entire shaft 20 escaping. The shaft 20 has a front end forming a housing section 22, which has a top end close to the inner wall of the hollow tube 10 to form different gaps G1 and G2 in the axial direction of the shaft 20. The resilient member 221 is located on the housing section abutting the gaps and is in contact with the inner wall of the hollow tube 10 in normal condition, and is made from a resilient and cushion material such as rubber, which is deformable.

Figure 3A:
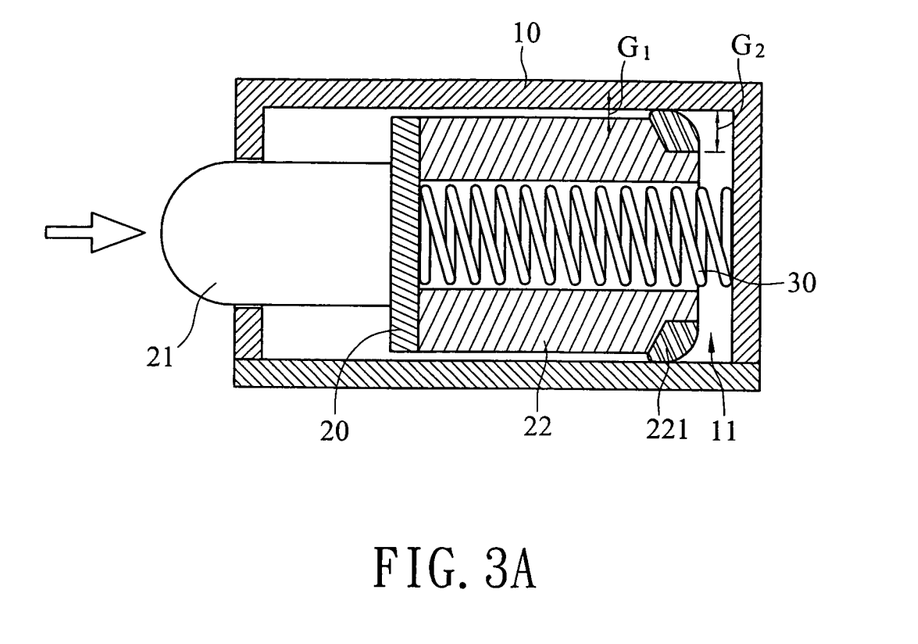
FIGS. 3A and 3B are schematic views of the first embodiment in operating conditions.
Figure 3B:
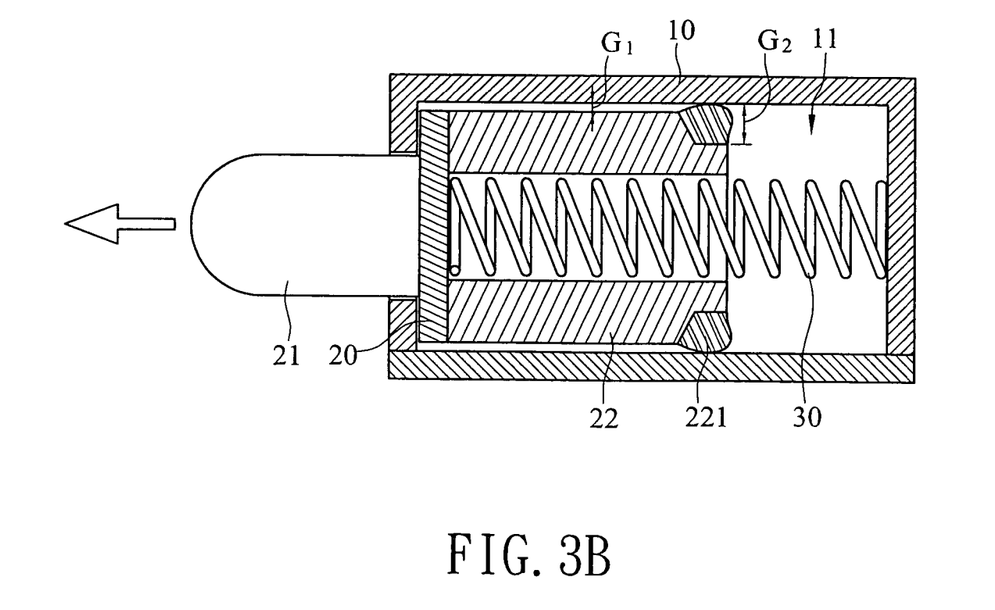

When in use, and the cabinet door 71 is opened (referring to FIG. 1A), the shaft 20 is pushed by the elastic element 30 and the tongue 21 is extended and exposed outside the hollow tube 10 (referring to FIG. 3B). When the shaft 20 is moved outwards, a friction force occurs between the resilient member 221 and the inner wall of the hollow tube 10. As the gap $G_2$ between the housing section 22 and the inner wall of the hollow tube 10 is greater, the resilient member 221 is deformed with relatively less constraint, and the friction force is smaller. Hence the tongue 21 reaches a desired position quickly.

On the other hand, when the cabinet door 71 is closed (referring to FIG. 1B), the tongue 21 is compressed by the cabinet door 71 and moved inwards (referring to FIG. 3A). The contact between the tongue 21 and the cabinet door 71 generates a friction. Hence the distal end of the tongue 21 is formed with a curved shape to avoid damaging the cabinet door 71. Meanwhile, a friction occurs between the resilient member 221 and the inner wall of the hollow tube 10. As the gap $G_1$ between the housing section 22 and the inner wall of the hollow tube 10 is smaller, the space for deformation of the resilient member 221 is limited. Hence the friction force is much greater, thus a buffer effect is achieved. Of course, the forces of the elastic element 30 and the resilient member 221 have to be smaller than the force of closing the cabinet door 71, to allow the cabinet door 71 to be closed as desired.

Figure 4A:
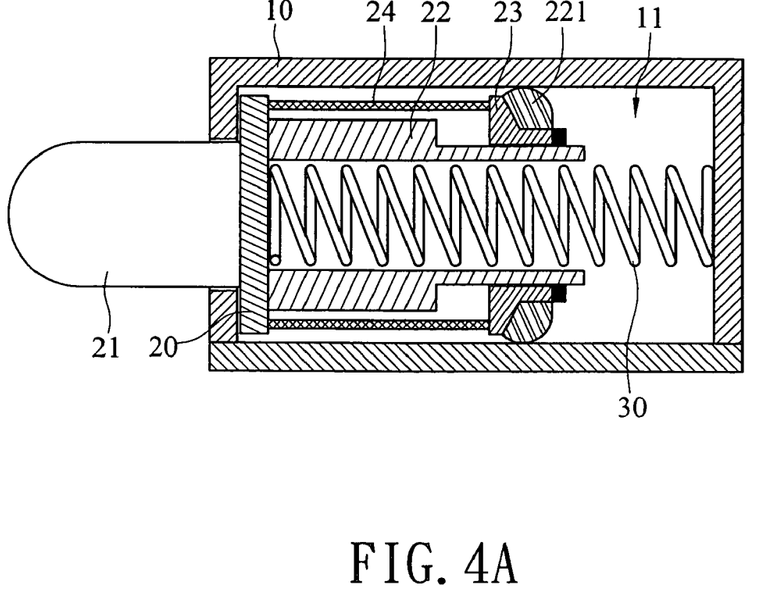
FIG. 4A is a schematic view of a second embodiment of the invention.
Figure 4B:
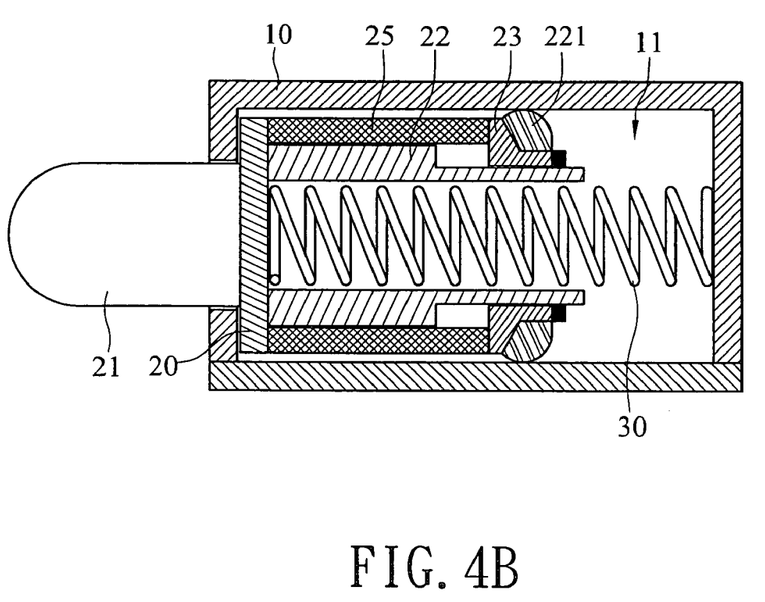
FIG. 4B is a schematic view of a third embodiment of the invention.

Refer to FIG. 4A for a second embodiment of the invention. A sliding member 23 is located on the outer side of the shaft 20. The sliding member 23 also forms different gaps with the inner wall of the hollow tube as the previous embodiment does. It also is coupled with the resilient member 221. And it is connected to the shaft 20 through a flexible element 24 which may be made from plastics, steel wire, or the like so that the shaft 20 is connected to the sliding member 23 without restricting its motion. Refer to FIG. 4B for a third embodiment. In this embodiment, the flexible element 24 is replaced by a coupling ring 25 made from a buffer material (such as rubber).

Figure 1B:
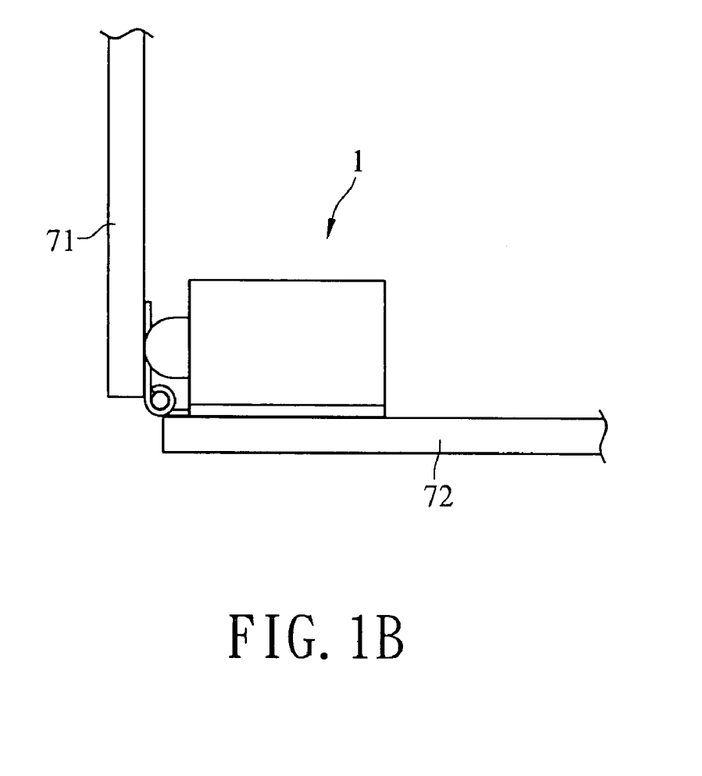
Figure 5A:
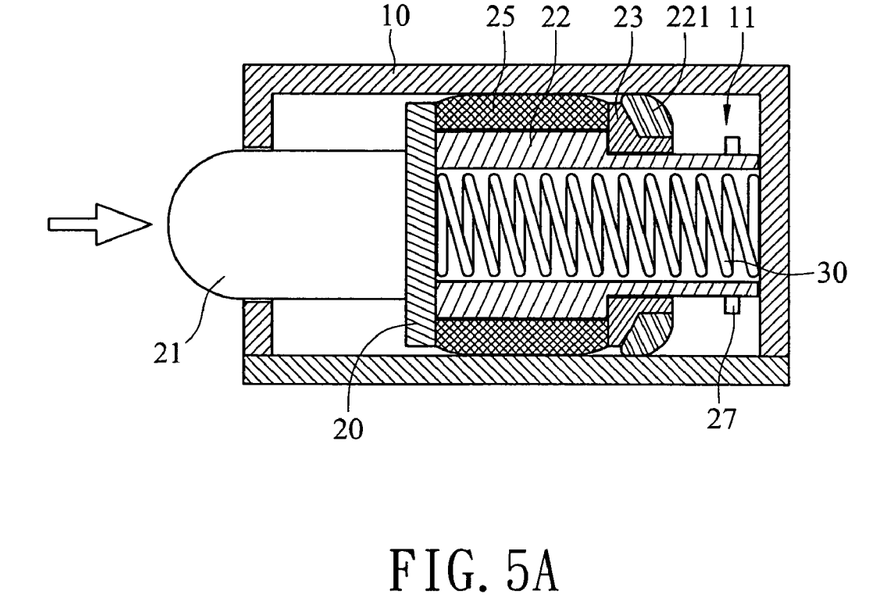
FIGS. 5A and 5B are schematic views of the third embodiment in operating conditions.
Figure 5B:
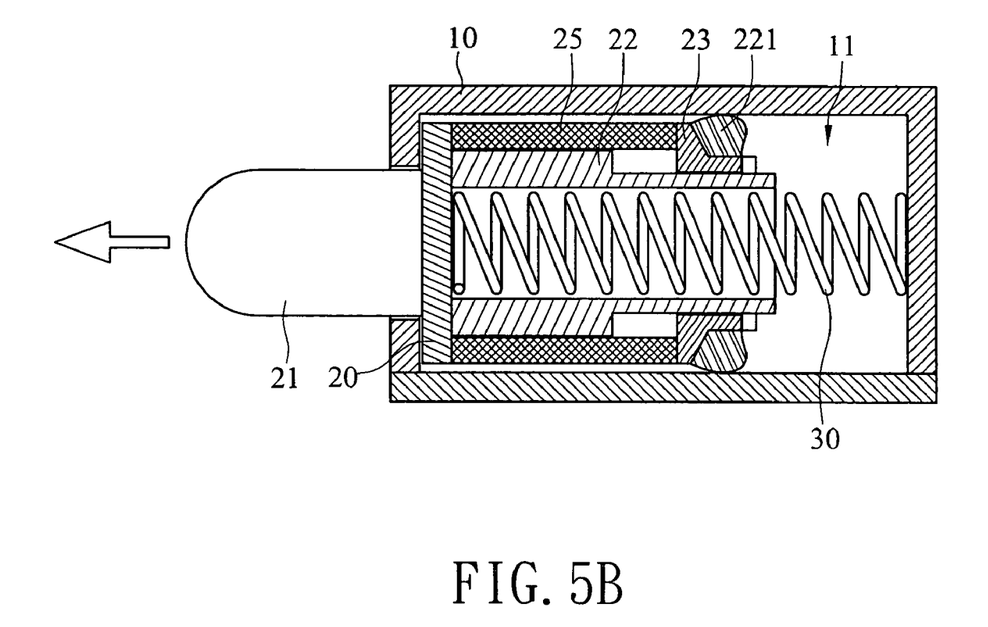
Figure 6:
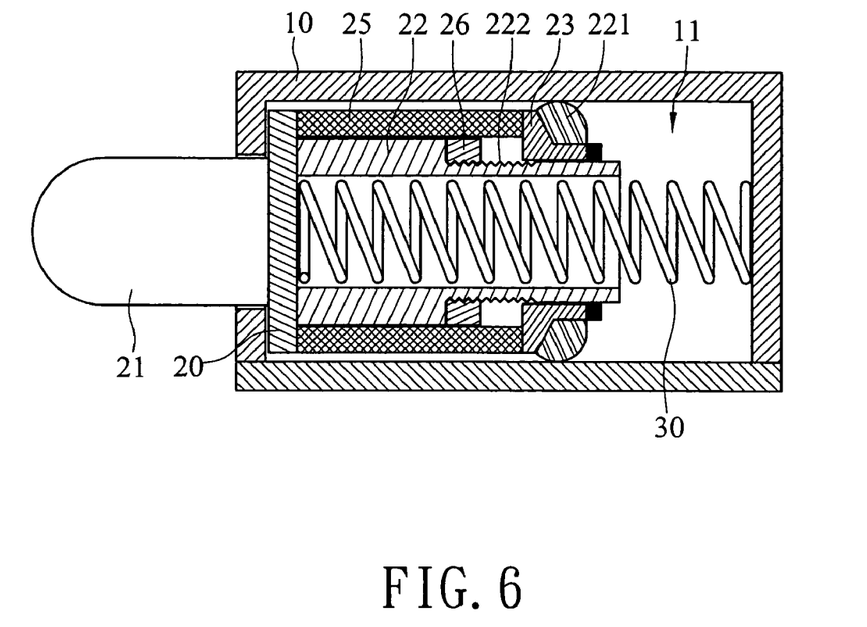
FIG. 6 is a schematic view of a third embodiment of the invention including an adjustment mechanism.

The coupling ring 25 has one end fastened to the shaft 20 and the other end connected to a sliding member 23. When the cabinet door 71 is opened as shown in FIG. 1A, it is pushed by the elastic element 30, and the tongue 21 is exposed outside the hollow tube 10, and the coupling ring 25 is driven to move the sliding member 23 (referring to FIG. 5B). As the sliding member 23 is rigid and only connected to the coupling ring 25, when the coupling ring 25 moves the sliding member 23, the coupling ring 25 is extended and deformed and its outer diameter shrinks slightly, therefore the friction between the coupling ring and the inner wall of the hollow tube 10 decreases. Thus the tongue 21 may return easier. In order to protect the coupling ring 25 from being damaged because of over extension, a hard circular ring 27 may be fastened to the top end of the shaft 20 to limit the maximum extension length of the coupling ring 25. When the cabinet door 71 is closed as shown in FIG. 1B, the tongue 21 will be pushed and the shaft 20 will slide inwards in the hollow tube 10. The sliding member 23 remains stationary, due to its rigidity when the shaft 20 is just moved inwards. The coupling ring 25 is pushed by the shaft 20 and the front side is stopped by the sliding member 23, thus the coupling ring 25 is compressed and deformed to slightly expand its outer diameter (referring to FIG. 5A), and an interference occurs in the interior of the hollow tube 10 to generate a required buffer resistant force. In this embodiment, both the resilient member 221 and the coupling ring 25 provide buffer forces. The shaft 20 has a neck section 222 to couple with an adjustment member 26 to adjust the sliding distance of the sliding member 23 as shown in FIG. 6 so that the deformation of the coupling ring 25 may be altered to adjust the buffer force.

Figure 7:
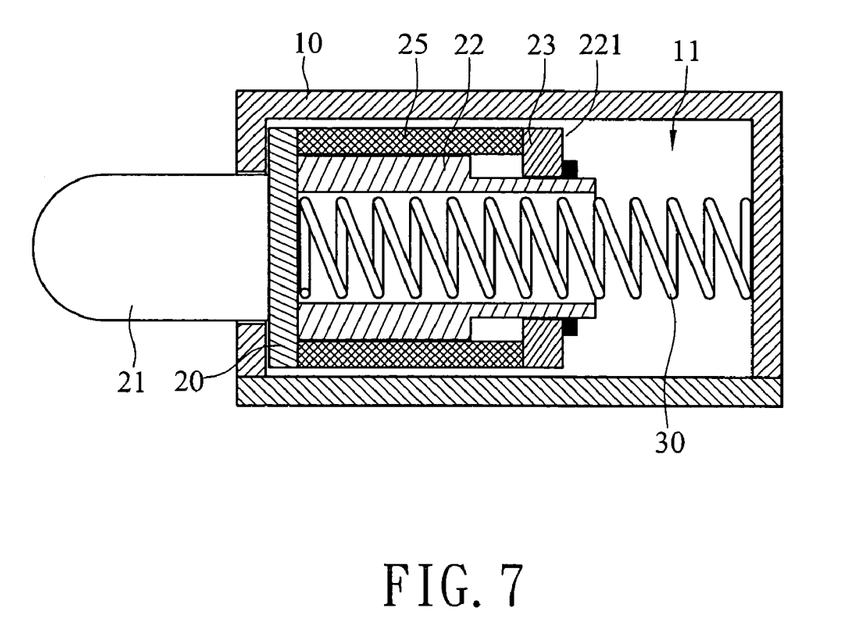
FIG. 7 is a schematic view of a fourth embodiment of the invention.
Figure 8:
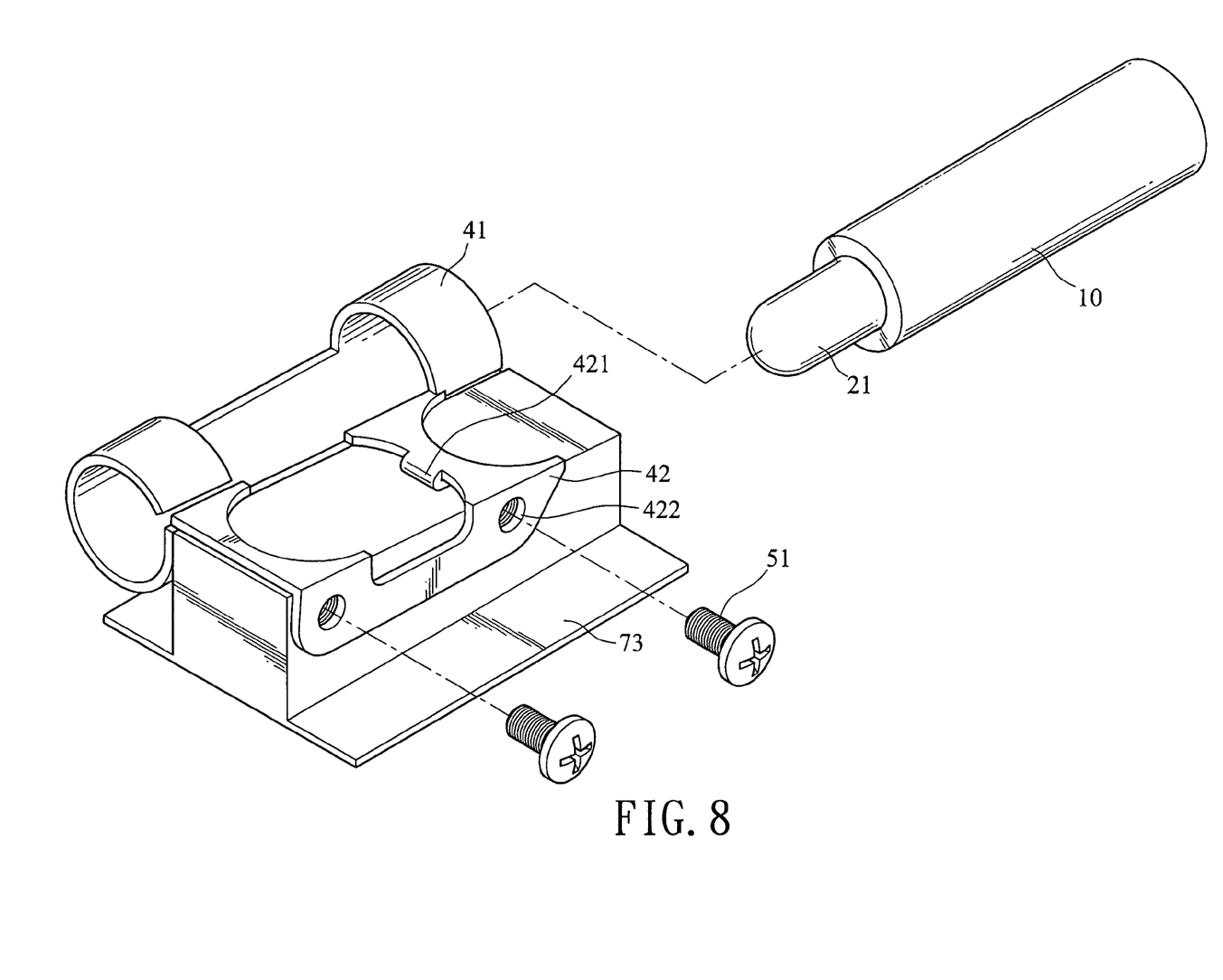
FIG. 8 is a schematic view of the invention in use.

Refer to FIG. 7 for a fourth embodiment of the invention. The resilient member 221 is dispensed with. The buffer force is provided by the coupling ring 25 only. Of course an adjustment mechanism may also be provided. On the other hand, also see FIG. 2, the gaps $G_1$ and $G_2$ on two sides may also be altered to adjust the buffer force generated. In applications, besides being fastened directly to the cabinet wall 72, the invention may also be mounted on a bracket 42(not shown in FIG. 7). Referring to FIG. 8, a bracket 42 is mounted on a hinge seat 73, which has an annular member 41 on one side. The annular ring 41 is hollow to house and fasten a cabinet door buffer bar 1. The bracket 42 has a hook section 421 to couple on the hinge seat 73. Then screws 51 through fastening holes 422 fasten the bracket. Such a design is more convenient.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments, which do not depart from the spirit and scope of the invention.

What is claimed is:

1. A cabinet door buffer bar, mounted onto a cabinet having a pivot axle between a cabinet door and a cabinet wall, the cabinet door buffer bar providing a buffer for the cabinet door during closing, comprising:

a hollow tube mounted onto the cabinet door or the cabinet wall, and abutting one of the cabinet door and the cabinet wall, said hollow tube having a housing compartment;

a shaft movably located in the housing compartment, the shaft having a tongue on a rear end thereof exposed outside the hollow tube, the shaft having a front end with a diameter smaller than a rear end, the shaft being adjacent an inner wall of the hollow tube, differences in diameter of the shaft forming a gap with portions of different dimensions between the shaft and the inner wall of the hollow tube in the axial direction of the shaft;

an elastic element located in the hollow tube pressing the shaft to expose the tongue outside the hollow tube in normal conditions; and a resilient member connected to the front end of the shaft, the resilient member having a portion in contact with the inner wall of the hollow tube;

wherein when pushing the tongue of the shaft, inwards the resilient member generates greater friction with the inner wall than when the tongue is moved outwards due to the resilient member being moved toward the smaller gap between the shaft and the inner wall of the hollow tube during pushing of the tongue and being moved away from the smaller gap when the tongue is moved outwards whereby, a greater buffer force is provided during pushing of the tongue than during outward movement of the tongue.

2. The cabinet door buffer bar of claim 1, wherein the tongue has a distal end formed in a curved shape to smooth contact with the cabinet door or the cabinet wall.

3. The cabinet door buffer bar of claim 1, wherein the elastic element is a spring.

4. The cabinet door buffer bar of claim 1, wherein the elastic element has a maintaining force smaller than the returning force of the cabinet door.

5. A cabinet door buffer bar, mounted onto a cabinet having a pivot axle between a cabinet door and a cabinet wall, the cabinet door buffer bar providing buffer for the cabinet door during closing, comprising:
   a hollow tube mounted onto the cabinet door or the cabinet wall, and abutting one of the cabinet door and the cabinet wall, said hollow tube having a housing compartment;
   a shaft movably located in the housing compartment, the shaft having a tongue on a rear end thereof exposed outside the hollow tube;
   an elastic element located in the hollow tube pressing the shaft to expose the tongue outside the hollow tube in normal conditions; and
   a sliding member located in the housing compartment between an outer side of the shaft and the hollow tube, the sliding member being movably connected to the shaft through a coupling ring made from a buffer material;
   wherein the tongue is movable inwards when subject to the compression of the cabinet door to compress the elastic element such that the coupling ring is blocked by the sliding member and expands slightly radially to generate a friction force between the coupling ring and an inner wall of the hollow tube to provide a buffer force; when the tongue moves outwards, the coupling ring drags the sliding member such that the coupling ring shrinks slightly radially.

6. The cabinet door buffer bar of claim 5, wherein the tongue has a distal end formed in a curved shape to smooth contact with the cabinet door or the cabinet wall.

7. The cabinet door buffer bar of claim 5, wherein the elastic element is a spring.

8. The cabinet door buffer bar of claim 5, wherein the elastic element has a maintaining force smaller than a returning force of the cabinet door.

9. The cabinet door buffer bar of claim 5, wherein the sliding member having a front end with smaller diameter to form a gap with portions of different dimensions in the axial direction of the shaft.

10. The cabinet door buffer bar of claim 9, wherein the sliding member is coupled with a resilient member on the front end which has a portion in contact with the inner wall of the hollow tube, wherein when pushing the tongue of the shaft inwards, the resilient member generates greater friction than when the tongue is moved outwards due to the resilient member being moved to a smaller gap when the tongue is moved outwards, whereby a greater buffer force is provided during pushing of the tongue than during outward movement of the tongue.

11. The cabinet door buffer bar of claim 5, further having an adjustment member movably mounted on the front end of the shaft having a neck section of a smaller thickness to house the adjustment member such that an interval between the sliding member and adjustment member is adjustable through the adjustment member.

12. The cabinet door buffer bar of claim 5, further having a bracket for fastening to a hinge of the cabinet door.

13. The cabinet door buffer bar of claim 12, wherein the bracket has an annular member for installing and anchoring the cabinet door buffer bar.

14. The cabinet door buffer bar of claim 12, wherein the bracket has a hook section to fasten to a hinge seat.

* * * * *